United States Patent
Kaji et al.

(10) Patent No.: US 10,507,696 B2
(45) Date of Patent: Dec. 17, 2019

(54) PNEUMATIC TIRE

(71) Applicant: BRIDGESTONE CORPORATION, Tokyo (JP)

(72) Inventors: Yoshio Kaji, Higashimurayama (JP); Shinsaku Katayama, Kodaira (JP); Eisuke Seta, Akishima (JP); Takayuki Kurata, Kokubunji (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 541 days.

(21) Appl. No.: 14/435,536

(22) PCT Filed: Oct. 23, 2013

(86) PCT No.: PCT/JP2013/006273
§ 371 (c)(1),
(2) Date: Apr. 14, 2015

(87) PCT Pub. No.: WO2014/064936
PCT Pub. Date: May 1, 2014

(65) Prior Publication Data
US 2015/0266346 A1 Sep. 24, 2015

(30) Foreign Application Priority Data

Oct. 24, 2012 (JP) .................... 2012-235011
Jan. 22, 2013 (JP) .................... 2013-009549

(51) Int. Cl.
*B60C 11/12* (2006.01)
(52) U.S. Cl.
CPC ........ *B60C 11/1218* (2013.01); *B60C 11/124* (2013.01); *B60C 11/1259* (2013.01); *B60C 2011/1213* (2013.01)

(58) Field of Classification Search
CPC ............... B60C 11/124; B60C 11/1218; B60C 11/1204; B60C 11/1236; B60C 11/1259;
(Continued)

(56) References Cited

U.S. PATENT DOCUMENTS 2,302,027 A * 11/1942 Havens ............... B60C 11/0309
152/209.22
5,350,001 A 9/1994 Beckmann et al.
(Continued)

FOREIGN PATENT DOCUMENTS

CN 1860041 A 11/2006
EP 0515349 A1 11/1992
(Continued)

OTHER PUBLICATIONS

International Search Report of PCT/JP2013/006273, dated Nov. 19, 2013. [PCT/ISA/210].

*Primary Examiner* — Steven D Maki
*Assistant Examiner* — Philip N Schwartz
(74) *Attorney, Agent, or Firm* — Sughrue Mion, PLLC

(57) ABSTRACT

A pneumatic tire, having a plurality of sipes formed in land portions of a tread thereof so as to each extend in the tire width direction, characterized in that: in a cross section of the land portion orthogonal to the sipe extending direction, provided that an imaginary sipe main line links two ends in the tire radial direction of each sipe, at least two of the sipes are "inclined sipes" each having the sipe main line inclined with respect to the tire radial direction; each inclined sipe has inner bent portions each protruding with respect to the sipe main line with peaks positioned deeper than 20% of the sipe depth; and the sipe main line(s) of at least one of the inclined sipes are inclined in a direction opposite, with respect to the tire radial direction, to the sipe main line of any of the other inclined sipes.

18 Claims, 13 Drawing Sheets

(58) Field of Classification Search
CPC ..... B60C 2011/1227; B60C 2011/1209; B60C 2011/1213
See application file for complete search history.

(56) References Cited

U.S. PATENT DOCUMENTS

| | | | |
|---|---|---|---|
| 5,896,905 A * | 4/1999 | Lurois | ................. B60C 11/0083 152/209.14 |
| 6,427,737 B1 | 8/2002 | Katayama | |
| 2001/0002602 A1 | 6/2001 | Nakamura | |
| 2002/0043318 A1 | 4/2002 | Kuze | |
| 2006/0169377 A1* | 8/2006 | Hashimoto | ............. B60C 11/12 152/209.23 |
| 2012/0132337 A1* | 5/2012 | Toulemont | .............. B60C 11/12 152/209.23 |

FOREIGN PATENT DOCUMENTS

| | | | | |
|---|---|---|---|---|
| EP | 0952011 A2 | 10/1999 | | |
| EP | 1533141 A1 * | 5/2005 | ......... | B29D 30/0606 |
| JP | 10-80923 A | 3/1998 | | |
| JP | 2000-6618 A | 1/2000 | | |
| JP | 2006-298055 A | 11/2006 | | |
| JP | 2008-49971 A | 3/2008 | | |
| WO | 94/21478 A1 | 9/1994 | | |
| WO | 2007/145603 A1 | 12/2007 | | |
| WO | WO-2010063751 A1 * | 6/2010 | ............. | B60C 11/12 |

* cited by examiner

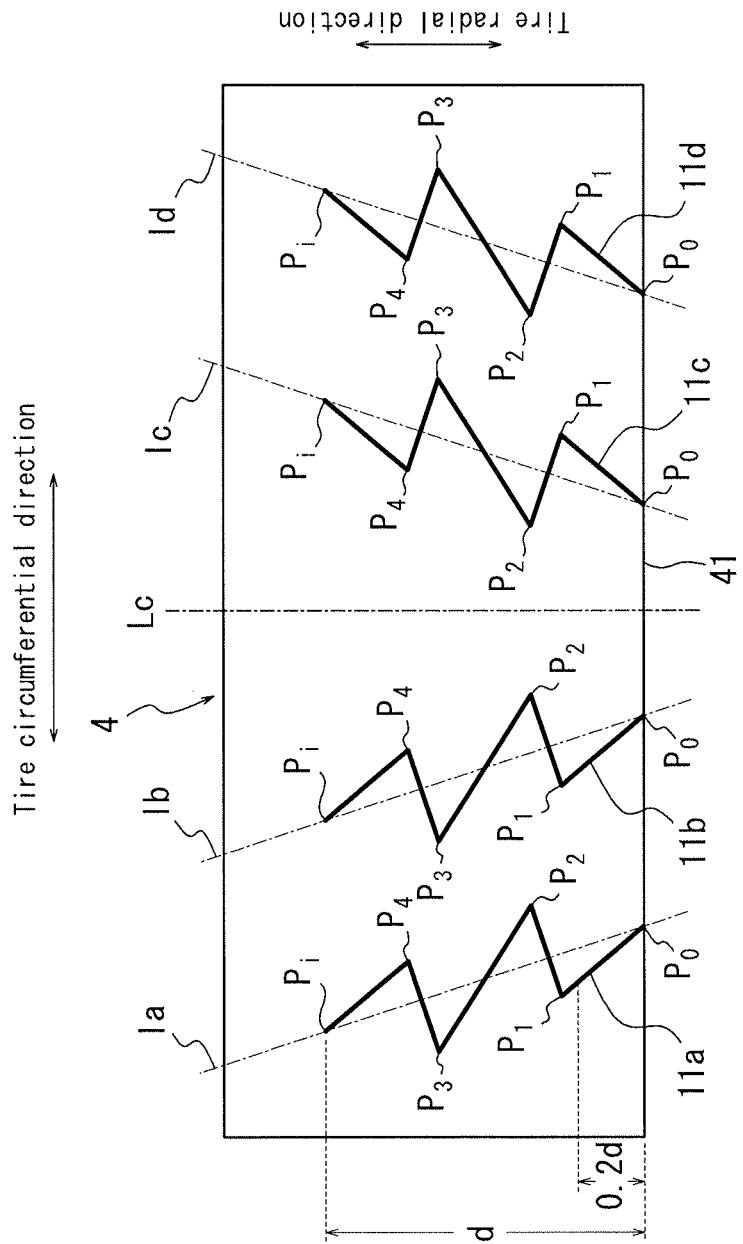

PNEUMATIC TIRE

CROSS REFERENCE TO RELATED APPLICATIONS

This application is a National Stage of International Application No. PCT/JP2013/006273 filed Oct. 23, 2013, claiming priorities based on Japanese Patent Application Nos. 2012-235011, filed Oct. 24, 2012, and 2013-009549, filed Jan. 22, 2013, the contents of all of which are incorporated herein by reference in their entirety.

TECHNICAL FIELD

The present invention relates to a pneumatic tire having a plurality of sipes formed at surfaces of land portions of a tread so as to each extend in the tire width direction.

BACKGROUND ART

A tire for running on a snowy road surface has been conventionally provided with a plurality of sipes formed at surfaces of land portions of a tread thereof to each extend in the tire width direction so that the sipes cause edge effects to improve on-snow performances such as traction performance and braking performance on a snowy road.

Such a tire as described above having sipes formed in land portions thereof exhibits improved on-snow performances but performances in dry conditions and performances in wet conditions of the tire may deteriorate because the finely-sectioned land portions have poor rigidity. In view of this, there have been proposed three-dimensional sipes in recent years each of which changes configurations not only at a ground contact surface of a tread but also in the depth direction thereof, to facilitate contact between finely-sectioned land portions thereof and thus suppress deformation of the land portions to eventually improve dry performances and wet performances of the tire, as in PTL 1.

CITATION LIST

Patent Literature

PTL 1: JP2008-049971

SUMMARY

However, a tire having 3D sipes as described above formed in land portions thereof exhibits deteriorated on-snow performances because edge effects of the sipes diminish due to the suppressed deformation of the land portions. It has been therefore difficult to improve on-snow performances, dry performances and wet performances of a tire at the same time.

The present invention aims at solving the prior art problem described above and an object thereof is to provide a pneumatic tire capable of improving on-snow performances, dry performances and wet performances thereof at the same time.

A pneumatic tire of the present invention is a pneumatic tire having a plurality of sipes formed in land portions of a tread thereof so as to each open at a surface of a land portion and extend in the tire width direction, characterized in that:

in a cross section of the land portion in a direction orthogonal to the sipe extending direction, provided that an imaginary line linking an open end at the surface of the land portion and the innermost end in the tire radial direction of each sipe is regarded as a sipe main line, at least two of the sipes in the land portion are "inclined sipes" in which the sipe main lines thereof are each inclined with respect to the tire radial direction;

each inclined sipe has inner bent portions each protruding with respect to the sipe main line and peaks of the inner bent portions are positioned deeper than 20% of the sipe depth measured from the surface of the land portion in the cross section; and the sipe main line(s) of at least one of the inclined sipes are inclined in a direction opposite, with respect to the tire radial direction, to the sipe main line of any one of the other inclined sipes in the cross section.

In the present specification and the appended claims, a "sipe" represents a fine groove having a groove width allowing groove wall surfaces facing each other of the groove to at least partially be brought into contact with each other at a ground contact portion of a tire (e.g. a groove width ≤0.7 mm).

Further, "extending in the tire width direction", which naturally represents extending exactly along the tire width direction, may alternatively represent extending to be inclined with respect to the tire width direction by a small angle (45° or less). Configurations of sipes and the like are measured in a state where a tire has been assembled with a prescribed rim and inflated at predetermined internal pressure with no load thereon, unless specified otherwise, in the present invention.

In this connection, a "prescribed rim" represents a rim prescribed for each tire by an industrial standard which is valid in an area where the tire is manufactured and used, and examples thereof include: a standard rim in the case of JATMA (The Japan Automobile Tyre Manufacturers Association, Inc.); "Design Rim" in the case of TRA (THE TIRE and RIM ASSOCIATION INC.); and "Measuring RIM" in the case of ETRTO (European Tyre and Rim Technical Organisation).

Further, "predetermined internal pressure" represents internal air pressure (the maximum air pressure) of a tire corresponding to the maximum loading capacity of the tire prescribed according to the tire size by an industrial standard such as JATMA described above and "the maximum loading capacity" represents the maximum mass which the tire is allowed to bear according to the industrial standard.

Air for inflating a tire may be replaced with inert gas such as nitrogen gas or the like in the present invention.

According to the present invention, it is possible to provide a pneumatic tire capable of improving on-snow performances, dry performances and wet performances thereof at the same time.

BRIEF DESCRIPTION OF THE DRAWINGS

The present invention will be further described below with reference to the accompanying drawings, wherein:

FIG. 6 is a view showing a cross section of inclined sipes, in a direction orthogonal to the sipe extending direction or the tire width direction, of the tire shown in FIG. 1;

DETAILED DESCRIPTION

An embodiment of the present invention will be demonstratively described with reference to the drawings hereinafter.

Figure 1:
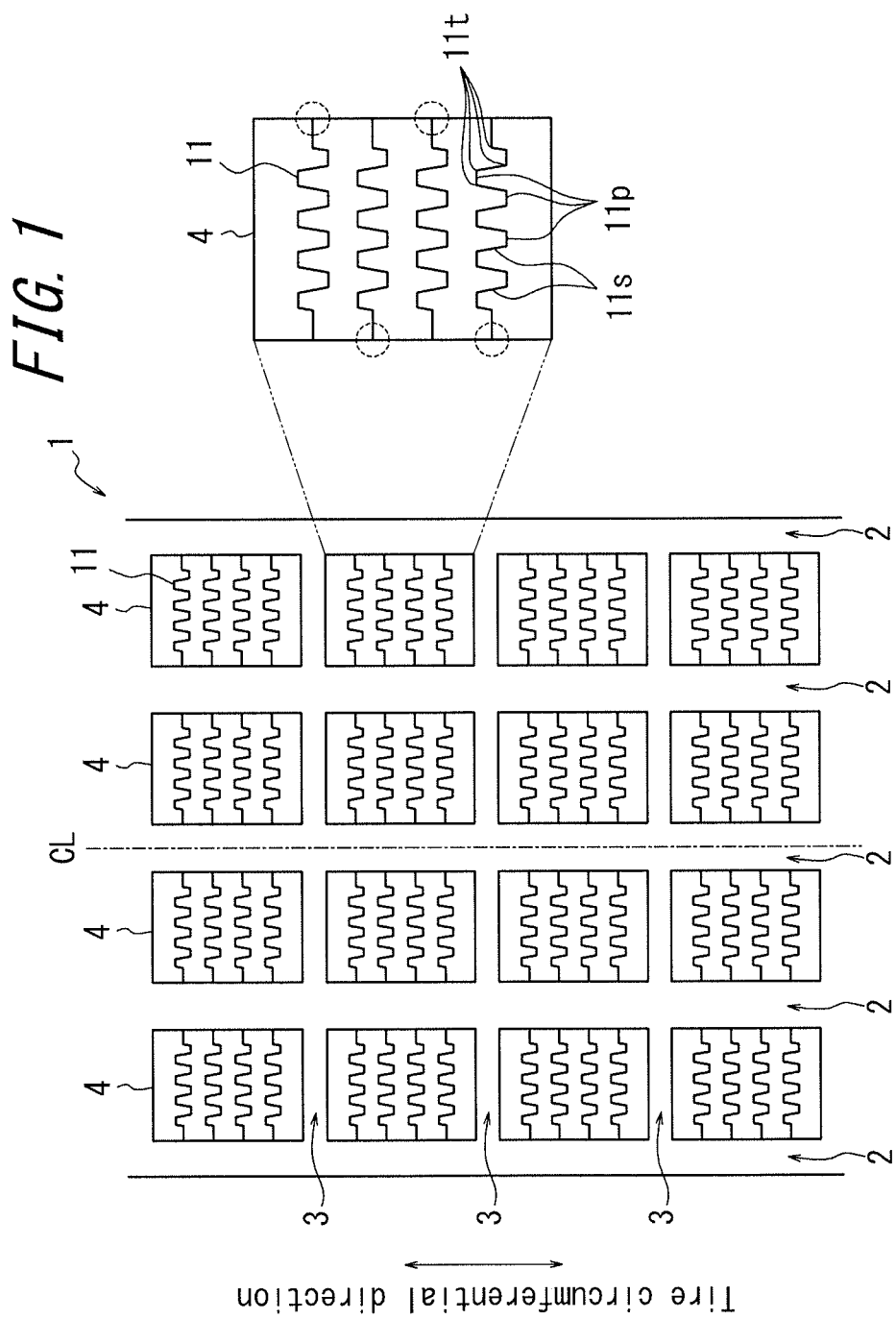
FIG. 1 is a partially developed view of a tread of a pneumatic tire according to one embodiment of the present invention.

FIG. 1 is a partially developed view of a tread 1 of a pneumatic tire (which tire will be referred to as "tire" hereinafter) according to one embodiment of the present invention. The tread 1 possesses land portions each having a block-like or rib-like shape. A plurality of block-shaped land portions 4 are demarcated by circumferential grooves 2 each extending in the tire circumferential direction and lateral grooves 3 each extending in the tire width direction to communicate with the two adjacent circumferential grooves 2, so that four rows of blocks are formed in the tire width direction, in an example shown in FIG. 1.

Figure 2:
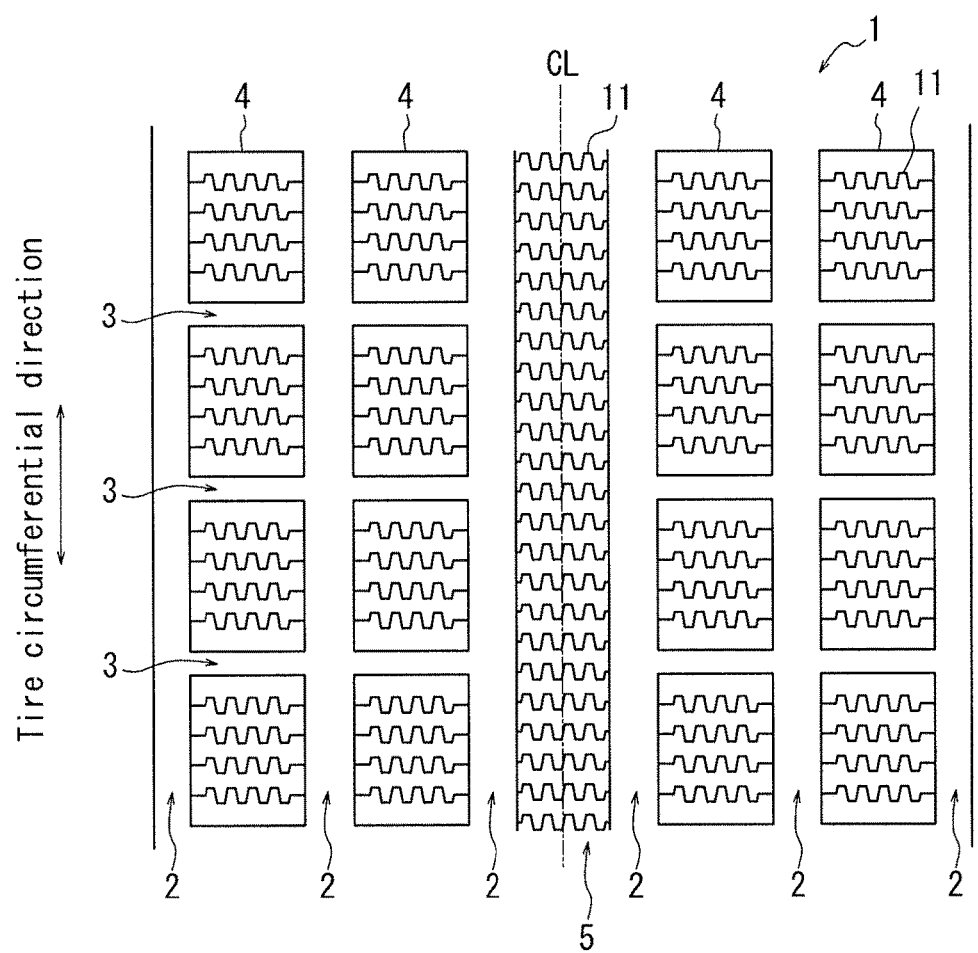
FIG. 2 is a partially developed view of a tread of a pneumatic tire according to another embodiment of the present invention.

According to another embodiment of the present invention, a rib-shaped land portion is formed in the center portion and block-shaped land portions are formed in the remaining portions of the tread 1, as shown in FIG. 2. Although the tire of the embodiment shown in FIG. 1 will be described hereinafter, effects similar to the FIG. 1 embodiment are caused in the FIG. 2 embodiment, as well.

The circumferential grooves 2 and the lateral grooves 3 may alternatively each extend in a zigzag, wavy or cranked manner, for example, although these grooves unanimously extend in a linear manner in the example shown in FIG. 1. The circumferential groove 2 may extend to be slightly inclined with respect to the tire circumferential direction, although the circumferential groove 2 extend exactly in the circumferential direction in the example shown in FIG. 1. The lateral groove 3 may extend to be slightly inclined with respect to the tire width direction, although the lateral groove 3 extend exactly in the tire width direction in the example shown in FIG. 1.

Each block of the land portions 4 is provided with sipes 11 (four sipes in the example shown in FIG. 1) formed to open at a surface of the block and extend in the tire width direction. Designing at least two sipes as "inclined sipes" described below in each block suffices in the present invention, although the sipes 11 are unanimously inclined sipes in the example shown in FIG. 1.

Each sipe 11 takes on, at a surface of the land portion, a trapezoidal wave shape constituted of repetition of a portion 11p extending in the extending direction of the sipe 11 and a portion 11s extending to be inclined with respect to the sipe extending direction with a peak 11t as a bent point or a surface bent portion between the two portions 11p, 11s, as shown in FIG. 1. Due to this structure, the sipe 11 can have good edge components in the tire width direction, thereby well improving stability and controllability of the tire. Further, due to the structure, it is possible to controllably suppress the land portion surface's locally sinking at the surface bent portions of the sipes when the tire is running on a snowy road surface, thereby preventing deterioration of on-snow performances of the tire, and it is also possible to make the ground contact pressure experienced by the land portions even to suppress a decrease in friction coefficient between the land portions and a road surface when the tire is running on a normal road surface, thereby ensuring satisfactory dry performances and wet performances of the tire, as well. A "sipe extending direction" represents a direction in which a sipe as a whole generally extends and corresponds to the tire width direction in the embodiments shown in FIGS. 1 to 4.

Figure 3:
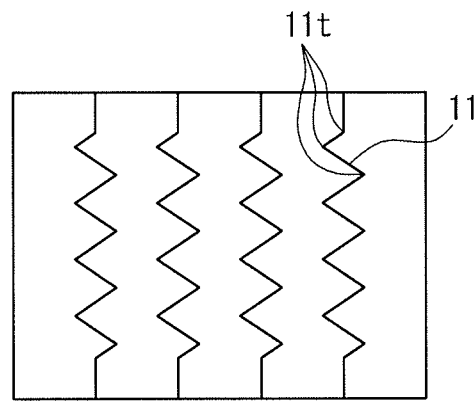
FIG. 3 is a view showing a surface of a block-shaped land portion of a pneumatic tire according to yet another embodiment of the present invention.

Alternatively, at a surface of the land portion each sipe 11 may extend in a zigzag manner with amplitudes in the tire circumferential direction and bend at peaks 11t as the surface bent portions, except at respective ends in the tire width direction thereof, as shown in FIG. 3. The sipe 11 can have good edge components in the tire width direction in this case, thereby well improving stability and controllability of the tire.

Yet alternatively, each sipe 11 may have at a surface of the land portion a configuration constituted of repetition of a widthwise portion 11w extending to be slightly inclined with respect to the tire width direction and a circumferential portion 11r extending to be slightly inclined with respect to the tire circumferential direction so that the sipe 11 as a whole extends with sharply cranked bends. The sipe 11 can have satisfactory edge components in the tire width direction in this case, thereby well improving stability and controllability of the tire.

In this connection, it is preferable to set a ratio L2/L1 of a projected length L2 in the tire width direction of each tire widthwise portion 11w of the sipe 11 with respect to a length L1 in the tire width direction of the sipe 11 to be in the range of 0.4 to 0.6 in terms of enhancing block rigidity in the tire width direction and thus snow column shearing force in the tire width direction of the grooves with which the sipe 11 communicates.

Further, it is preferable to set an inclination angle $\theta_1$ formed by the tire widthwise portion 11w of the sipe 11 with respect to the tire width direction to be in the range of 5° to 30° in terms of making the edge components in the tire circumferential direction effectively work, while enhancing rigidity in the tire width direction of the block across a wide range in the tire circumferential direction. The inclination angle $\theta_1$ smaller than 5° can enhance rigidity in the tire width direction of the block only in a narrow range in the tire circumferential direction and the inclination angle $\theta_1$ larger than 30° may hinder the edge components in the tire circumferential direction from functioning satisfactorily.

Yet further, it is preferable to set an inclination angle $\theta_2$ formed by the tire circumferential portion 11r of the sipe 11 with respect to the tire circumferential direction to be larger than 5° in terms of enhancing rigidity in the tire width direction of the block and making the edge components in the tire circumferential direction work in a satisfactory manner.

Figure 4:
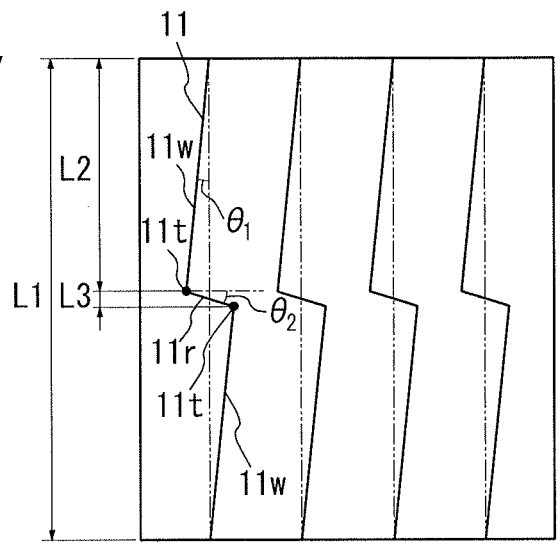
FIG. 4 is a view showing a surface of a block-shaped land portion of a pneumatic tire according to yet another embodiment of the present invention.

The sipe 11 may be smoothly curved in the surface bent portions thereof, although the sipe 11 sharply bends or is cranked at the surface bent portions 11t in the embodiments shown in FIGS. 1, 3 and 4 (a portion between the tire widthwise portion 11w and the tire circumferential portion 11r corresponds to the surface bent portion 11t in the embodiment shown in FIG. 4).

In this connection, too many surface bent portions existing in the sipe may locally increase the ground contact pressure in the vicinity thereof, thereby possibly causing a portion of the tread to float from a road surface and deteriorate on-snow traction performance and dry braking performance of the tire. On the other hand, a "straight-type" sipe having no surface bent portions at a surface of a land portion too easily releases snow caught therein when side force is applied thereto, thereby possibly deteriorating on-snow turning performance and thus on-snow stability and controllability of the tire.

Accordingly, it is possible to achieve on-snow traction performance, dry braking performance and on-snow stability and controllability in a highly compatible manner by providing at least some of the inclined sipes with two or less surface bent portions as shown, for example, in FIG. 4.

The sipe according to the embodiment shown in FIG. 4 may be provided at an end portion in the tire width direction thereof with a straight portion linearly extending in the tire width direction as in the example of FIG. 3. Further, it is preferable to reduce the amplitude in the tire circumferential direction of the surface bent portions of the sipe from the center of the sipe toward the outer side in the tire width direction thereof in terms of making production of tire molds easy (not shown in the drawings). The sipe may extend linearly at a surface of the land portion. However, the sipe having a trapezoidal wave shape, a zigzag shape or a sharply cranked shape as described above is preferable in terms of allowing the circumferentially extending portion thereof to have satisfactory edge components in the tire width direction and enhancing lateral force generated by the tire to ensure good on-snow stability.

The sipes may be formed such that they are symmetrically situated in the tire width direction in each block. In a case where an odd number of the sipes is formed in a block, the sipe situated at the middle in the tire circumferential direction may be a sipe extending in a zigzag-bent manner.

Figure 5:
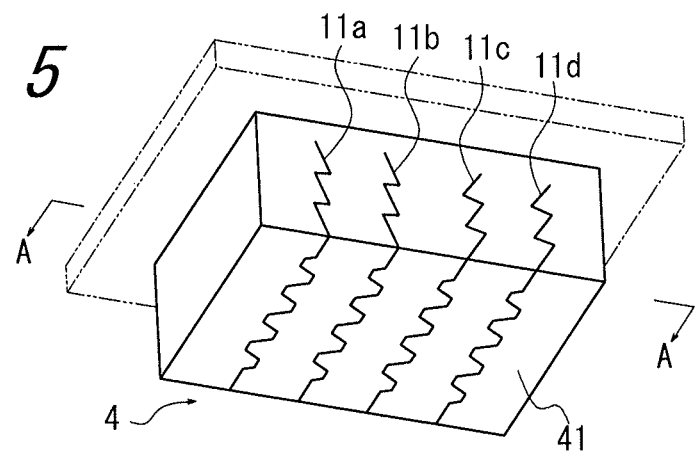
FIG. 5 is a perspective view of a block-shaped land portion of the tire shown in FIG. 1.

FIG. 5 is a perspective view of the block-shaped land portion 4 of the tire shown in FIG. 1. FIG. 6 is a cross sectional view cut along the A-A line in FIG. 5, i.e. a view showing a cross section orthogonal to the extending direction (the tire width direction) of the inclined sipe.

As shown in FIG. 6, four sharply-cranked sipes 11a to 11d formed in the land portion 4 are "inclined sipes" in each of which an imaginary line 1a, 1b, 1c, 1d linking an open end $P_o$ thereof at a surface 41 of the land portion and the innermost end $P_i$ thereof in the tire radial direction is inclined with respect to the tire radial direction (which imaginary line will be referred to as "sipe main line" hereinafter). Forming at least some of the sipes 11a to 11d extending in the tire width direction as inclined sipes facilitates collapse of the surface of the land portion in a driving/braking situation, thereby enhancing edge effects of the sipes and thus improving on-snow performance of the tire.

Each of the inclined sipes 11a to 11d has inner bent portions (four inner bent portions in the example shown in FIG. 6) each protruding with respect to the sipe main line 1a, 1b, 1c, 1d. Peaks $P_1$-$P_4$ of the inner bent portions are positioned deeper than 20% of the sipe depth d (d=7 mm, for example) measured from the surface of the land portion. Due to this structure, it is possible to bring the land portions finely sectioned by the sipes into contact with each other at deep positions in the sipes and suppress collapse of the land portions, without hindering deformation of the surfaces of the land portions on snow, thereby effectively improving dry performances and wet performances of the tire. Further, the sipe main lines 1a, 1b of the inclined sipes on one side (the left-hand side in FIGS. 5 and 6) of the block-shaped land portion 4 with respect to the center Lc in the tire circumferential direction of the block-shaped land portion 4 are inclined in a direction opposite, with respect to the tire radial direction, to the sipe main line(s) 1c, 1d of at least one (two in the present embodiment) of the inclined sipes on the other side (the right-hand side in FIGS. 5 and 6) of the block-shaped land portion 4. It is possible to make rigidity distribution of the block-shaped land portion even and on-snow performance, dry performances and wet performances of the tire stable by designing the sipe main lines to be inclined with respect to the tire radial direction as described above. Further, it is possible to facilitate collapse of the surface of the land portion for input force on each side in the tire circumferential direction, thereby achieving good on-snow performance in either a driving or braking situation, in this case. Yet further, considering that sipes are generally formed by subjecting a green tire having blades inserted therein to vulcanization, it is possible to prevent a tread from being damaged when the blades are pulled out after vulcanization by setting the sipe main lines to extend further apart from each other toward the inner side in the tire radial direction as described above.

Good edge effects caused by facilitated collapse of surfaces of the land portions improve on-snow performance, while suppressed collapse at deeper positions of the land portions due to facilitated contact of the land portions at the positions improves dry performances and wet performances, in the pneumatic tire of the present embodiment as described above.

In this connection, the direction in which each of the sipe main lines 1a-1d is inclined with respect to the tire radial direction (which direction will be referred to as the "inclination direction" of the sipe hereinafter) may be opposite to that shown in FIGS. 5 and 6 such that the inclined sipes approach one another toward the inner side in the tire radial direction with the center Lc in the tire circumferential direction of the block-shaped land portion 4 interposed therebetween. Alternatively, the inclined sipes may be arranged such that the sipe main lines of the respective two adjacent sipes are inclined to be opposite to each other with respect to the tire radial direction.

Yet alternatively, the sipes extending in a sharply cranked manner in the depth direction described above may be replaced with the sipes extending in a pulse wave-like configuration in the depth direction.

The sipes may extend substantially in the tire radial direction in the vicinity of the open end thereof, for convenience in the production process.

Effects caused by the tire of the present invention when input force Fi is applied thereto for driving/braking will be described by using FIGS. 7A to 7F. Only behaviors observed in the vicinity of the outermost inclined sipe 11a on one side of the tire circumferential direction, of the inclined sipes having the internal bent portions and formed in the block-shaped land portion 4, will be described hereinafter for convenience of explanation, although similar behaviors are observed in vicinities of the other inclined sipes having the internal bent portions, as well.

Figure 7A:
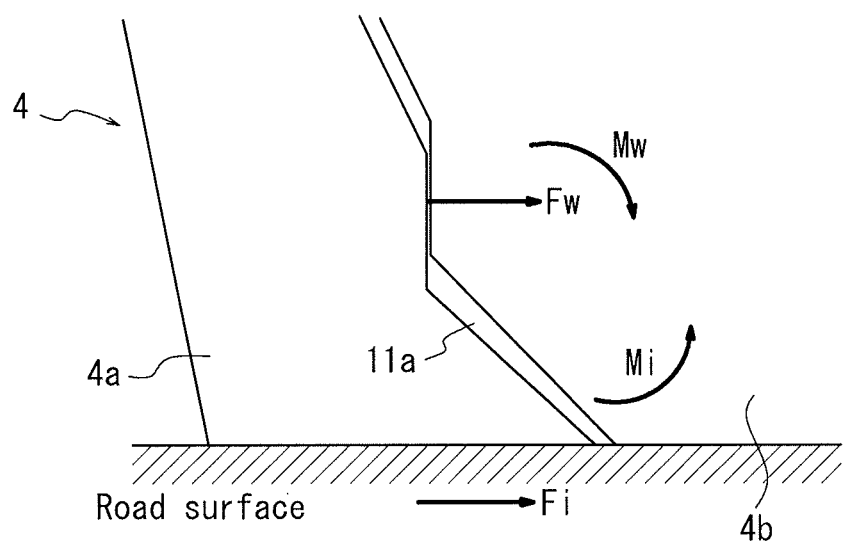
FIG. 7A is a view showing a state of a block-shaped land portion of the tire shown in FIG. 1 when force for driving/braking is inputted thereto.

FIG. 7A is a view showing an effect caused by the land portion 4 in the vicinity of the inclined sipe 11a when an input force is applied in the same direction as the circumferential direction in which the sipe main line 1a of the inclined sipe 11a in FIG. 5 extends toward the outer side in the tire radial direction (i.e. an input force from the left hand side to the right hand side in FIG. 7A).

As shown in FIG. 7A, respective groove wall surfaces of a portion extending in a direction opposite with respect to the tire radial direction to the sipe main line 1a, of the inclined sipe 11a, are brought into contact with each other, whereby a force Fw from a sub-land portion 4a on the input force side is exerted on a sub-land portion 4b on the side opposite, with respect to the sipe 11a, to the input force side. The force Fw generates the moment Mw collapsing the sub-land portion 4b to a road surface. The sub-land portion 4b is also subjected to the moment Mi, generated by the input force Fi, to cause the sub-land portion 4b to float from the road surface. These two moments Mw, Mi generated in the sub-land portion 4b cancel each other out because they are the moments of opposite directions, whereby deformation of the sub-land portion 4b is suppressed and dry performances and wet performances of the tire further improve.

The respective groove wall surfaces of the inclined sipe are brought into contact with each other preferably at a deep position in the land portion in terms of well suppressing collapse of the land portion. Peaks of the inner bent portions of each inclined sipe are therefore positioned deeper than 20% of the sipe depth d measured from the surface of the land portion in the tire of the present invention. It is possible to prevent the inclination direction of each inclined sipe from changing in the vicinity of an open end thereof when the land portion is slightly worn and thus prevent on-snow performance from deteriorating by the wear by locating the peaks of the inner bent portions at a deep position in the land portion.

Providing each inclined sipe with at least one inner bent portion suffices, although each inclined sipe is provided with the four inner bent portions in the embodiments shown in FIGS. 5 and 6. However, providing each inclined sipe with a plurality, preferably at least four, inner bent portions further increases rigidity of the land portion and further improves dry performances and wet performances of the tire.

Figure 7B:
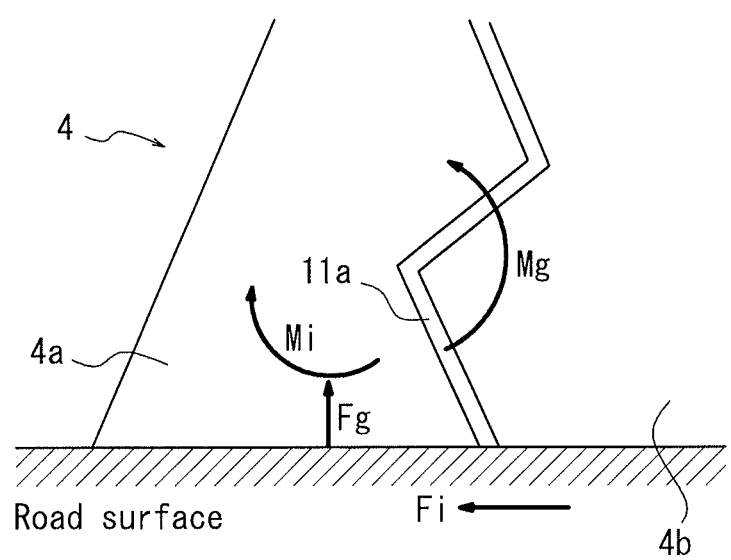
FIG. 7B is a view showing a state of a block-shaped land portion of the tire shown in FIG. 1 when force for driving/braking is inputted thereto.

FIG. 7B is a view showing an effect caused by the land portion 4 in the vicinity of the inclined sipe 11a when an input force is applied in the same direction as the circumferential direction in which the sipe main line 1a of the inclined sipe 11a extends toward the inner side in the tire radial direction (i.e. an input force from the right hand side to the left hand side in FIG. 7B).

As shown in FIG. 7B, the sub-land portion 4a on the side opposite, with respect to the sipe 11a, to the input force side is subjected to the moment Mg generated by a force Fg from the road surface to collapse the sub-land portion 4a to the road surface. The sub-land portion 4a is also subjected to the moment Mi, generated by the input force Fi, to cause the sub-land portion 4a to float from the road surface. These two moments Mg, Mi generated in the sub-land portion 4a cancel each other out because they are the moments of opposite directions, whereby deformation of the sub-land portion 4a is suppressed and dry performances and wet performances of the tire further improve.

As described above, the tire of the present invention is capable of suppressing deformation of the land portion for an input force in either direction in the tire circumferential direction and thus further improving dry performances and wet performances of the tire by the inclined sipes having the inner bent portions.

Further, although not specifically demonstrated by the drawings, it is possible to cause the sub-land portions divided by the sipes to support each other to further suppress deformation of the land portions, thereby further improving dry performances and the wet performances of the tire, by slanting the sipe main line of one inclined sipe in a direction opposite, with respect to the tire radial direction, to the sipe main line of any of the other inclined sipes.

The bottom of each inclined sipe may be raised, i.e. the sipe may be made shallow, in the vicinity of a position where the sipe opens to the circumferential groove 2, for example. The sipe depth may alternatively remain constant. Raising the bottom of the inclined sipe increases rigidity of the land portion and improves dry performances and wet performances but may deteriorate on-snow performance of the tire. In this regard, the tire of the present invention, capable of exhibiting higher rigidity of the land portions than a tire having the conventional sipes formed therein, can ensure good dry performances and good wet performances even if the number of the sipes having raised bottoms is reduced.

Accordingly, raising the sipe bottoms only at the positions indicated by dot circles in FIG. 1, for example, suffices in the present invention. Specifically, a bottom-raised portion is provided only at one end in the tire width direction of each of the sipes, in a staggered manner in the land portion as a whole, so that on-snow performance, dry performances and wet performances can be well achieved at the same time.

Figure 9A:
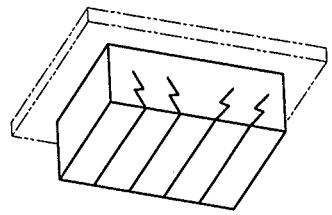
FIG. 9A is a perspective view showing a block-shaped land portion of an Example tire/a Comparative Example tire.
Figure 9B:
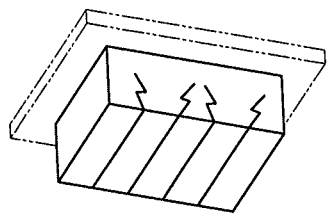
FIG. 9B is a perspective view showing a block-shaped land portion of an Example tire/a Comparative Example tire.
Figure 9C:
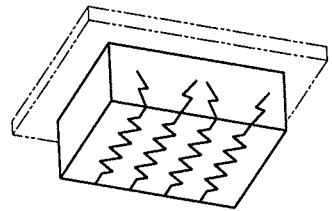
FIG. 9C is a perspective view showing a block-shaped land portion of an Example tire/a Comparative Example tire.
Figure 9D:
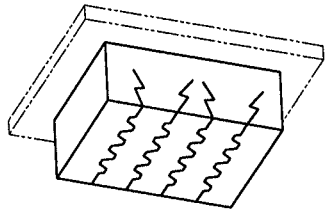
FIG. 9D is a perspective view showing a block-shaped land portion of an Example tire/a Comparative Example tire.
Figure 9E:
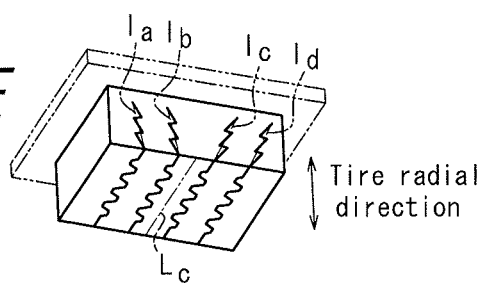
FIG. 9E is a perspective view showing a block-shaped land portion of an Example tire/a Comparative Example tire.

It is preferable that the land portions are block-shaped land portions demarcated by a plurality of circumferential grooves extending in the circumferential direction and a plurality of lateral grooves communicating with the respective adjacent two circumferential grooves; and in each block-shaped land portion the sipe main lines $1a$, $1b$ of the inclined sipes on one side, with respect to the center Lc in the tire circumferential direction of the block-shaped land portion, of the block-shaped land portion are slanted as shown in FIG. 9E in a direction opposite, with respect to the tire radial direction, to the sipe main lines $1c$, $1d$ of at least one inclined sipe (two inclined sipes in FIG. 9E) on the other side of the block-shaped land portion in terms of making production of the tire easy and making rigidity of the block-shaped land portion uniform to achieve good dry performances and wet performances of the tire in a stable manner.

Figure 10A:
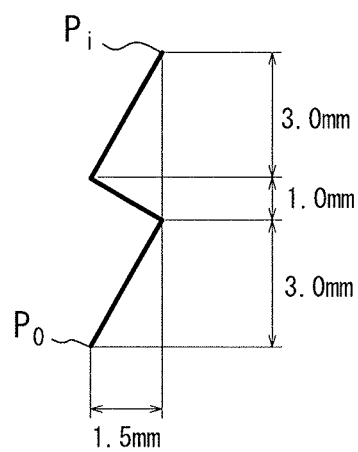
FIG. 10A is a view showing a configuration in the tire radial direction of a sipe formed in a block-shaped land portion of an Example tire/a Comparative Example tire.
Figure 10B:
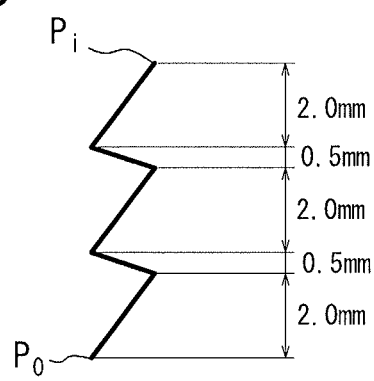
FIG. 10B is a view showing a configuration in the tire radial direction of a sipe formed in a block-shaped land portion of an Example tire/a Comparative Example tire.
Figure 10C:
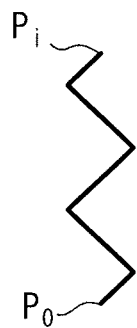
FIG. 10C is a view showing a configuration in the tire radial direction of a sipe formed in a block-shaped land portion of an Example tire/a Comparative Example tire.
Figure 10D:
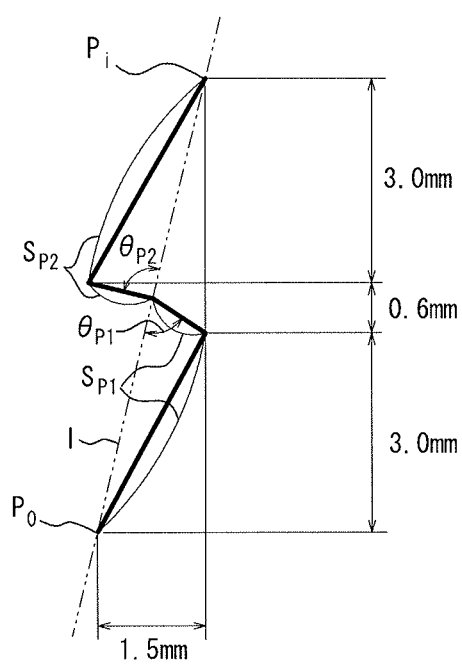
FIG. 10D is a view showing a configuration in the tire radial direction of a sipe formed in a block-shaped land portion of an Example tire/a Comparative Example tire.

In an inclined sipe having a first portion $S_{P1}$ and a second portion $S_{P2}$ adjacent to each other with the sipe main line 1 therebetween shown in FIG. 10D, the first portion $S_{P1}$ is different in configuration from the second portion $S_{P2}$. Specifically, an incident angle $\theta_{P1}$ formed by the first portion $S_{P1}$ with respect to the sipe main line 1 (75° in the example shown in FIG. 10D) is different from an incident angle $\theta_{P2}$ formed by the second portion $S_{P2}$ with respect to the sipe main line 1 (90° in the shown example). As a result, the size of the first portion $S_{P1}$ (the area of a region defined by the first portion $S_{P1}$ and the sipe main line 1 in FIG. 10D) is different from the size of the second portion $S_{P2}$ (the area of a region defined by the second portion $S_{P2}$ and the sipe main line 1 in FIG. 10D).

Figure 7C:
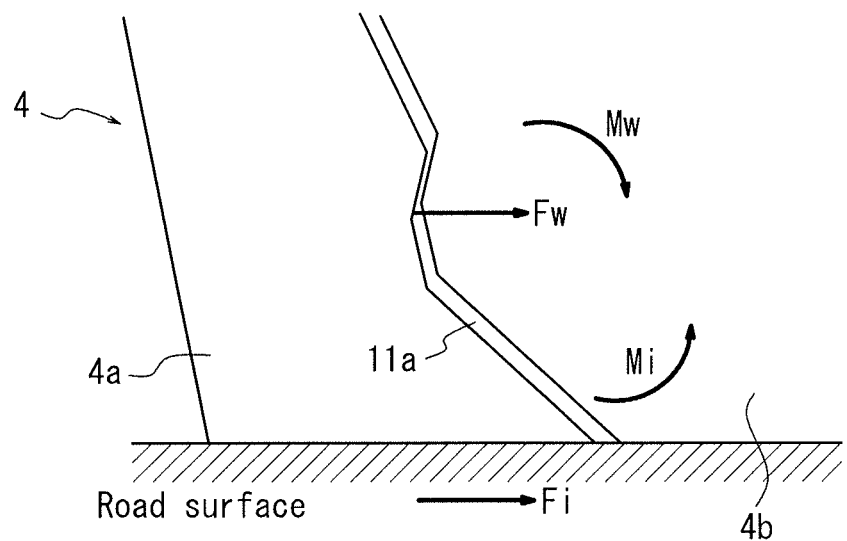
FIG. 7C is a view showing a state of a block-shaped land portion of the tire shown in FIG. 1 when force for driving/braking is inputted thereto.

FIG. 7C shows an effect caused by the land portion in the vicinity of the inclined sipe of FIG. 10D when an input force is applied in the same direction as the circumferential direction in which the sipe main line of the inclined sipe extends toward the outer side in the tire radial direction. In a case of the inclined sipe of FIG. 10D formed as described above, rigidity increases in the vicinity of the boundary between the first portion $S_{P1}$ and the second portion $S_{P2}$ because of the difference in configuration between these two portions. As a result, the moment Mw collapsing a sub-land portion $4b$ to a road surface can be more effectively generated than in the case shown in FIG. 7A by a force Fw exerted by a sub-land portion $4a$ on the sub-land portion $4b$ after the contact of respective groove wall surfaces of the sipe with each other, when the moment Mi is generated by an input force Fi to cause the sub-land portion $4b$ to float from the road surface. Accordingly, it is possible to generate the moment Mw capable of more reliably cancelling out the moment Mi caused by the input force Fi and thus suppress deformation of the sub-land portion $4b$ better, thereby improving the dry performances and the wet performances of the tire better.

Figure 7D:
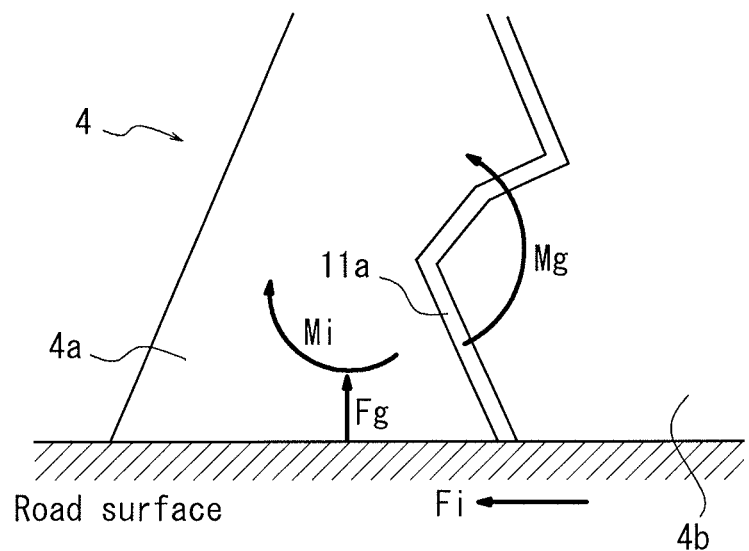
FIG. 7D is a view showing a state of a block-shaped land portion of the tire shown in FIG. 1 when force for driving/braking is inputted thereto.

FIG. 7D shows an effect caused by the land portion in the vicinity of the inclined sipe of FIG. 10D when an input force is applied in the same direction as the circumferential direction in which the sipe main line of the inclined sipe extends toward the inner side in the tire radial direction. In this case, the moment Mg collapsing the sub-land portion $4a$ to a road surface can be more effectively generated by a force Fg from the road surface than in the case shown in FIG. 7B because of the aforementioned increase in rigidity of the land portion when the moment Mi is generated by an input force Fi to cause the sub-land portion $4a$ to float from the road surface. Accordingly, it is possible to generate the moment Mg capable of more reliably cancelling out the moment Mi caused by the input force Fi and thus suppress deformation of the sub-land portion $4a$ better, thereby improving the dry performances and the wet performances of the tire better.

The configuration of the first portion $S_{P1}$ is differentiated from that of the second portion $S_{P2}$ by differentiating the incident angle $\theta_N$ of the first portion $S_{P1}$ on the sipe main line 1 from the incident angle $\theta_m$ of the second portion $S_{P2}$ on the sipe main line 1 in the aforementioned embodiment. However, the configurations of the first portion $S_{P1}$ and the second portion $S_{P2}$ can be differentiated from each other by other methods, e.g. by differentiating wavelengths of these two portions from each other. In short, an effect of cancelling out the moment Mi caused by the input force Fi, by the moment Mw/Mg, can be enhanced as long as the configurations of the first portion $S_{P1}$ and the second portion $S_{P2}$ are different from each other.

Figure 10E:
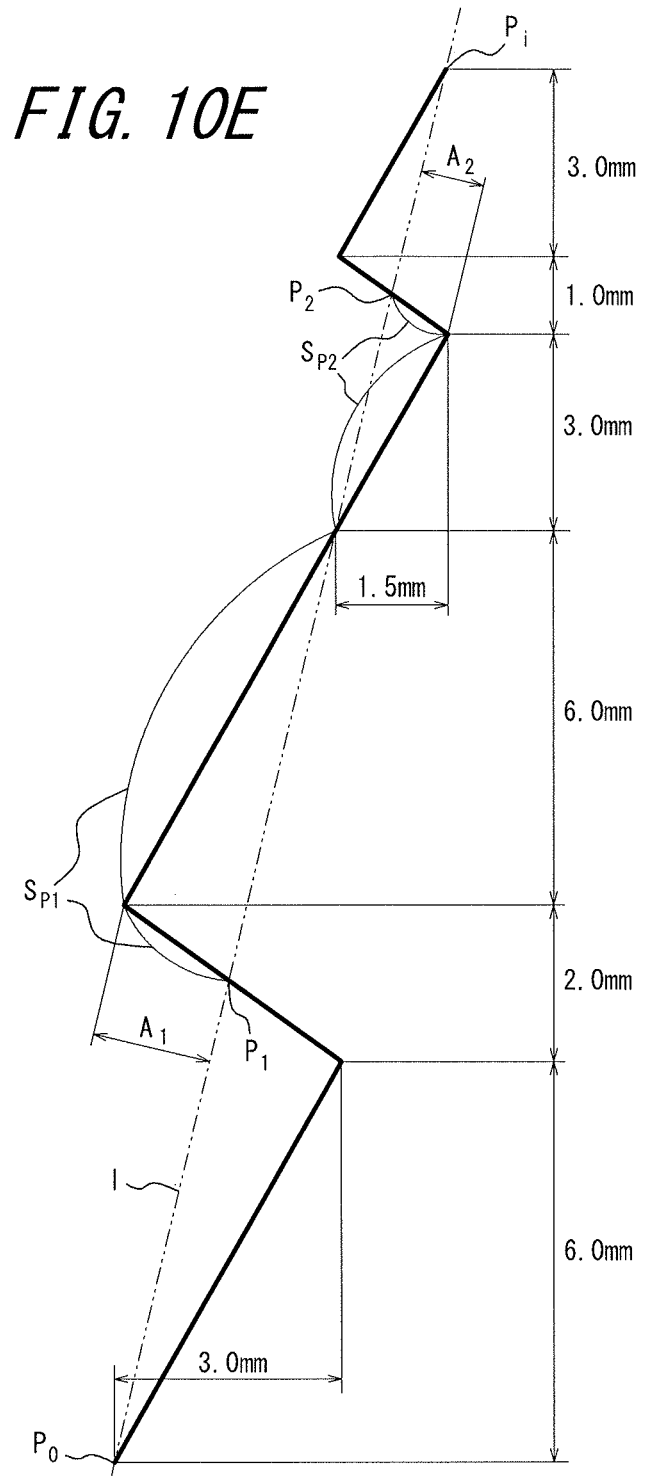
FIG. 10E is a view showing a configuration in the tire radial direction of a sipe formed in a block-shaped land portion of an Example tire/a Comparative Example tire.

In another inclined sipe having a first portion $S_{P1}$ and a second portion $S_{P2}$ adjacent to each other with the sipe main line 1 therebetween shown in FIG. 10E, an amplitude $A_1$ of the first portion $S_{P1}$ with respect to the sipe main line 1 (the maximum distance from the sipe main line: 0.8 mm in the example shown in FIG. 10E) is different from an amplitude $A_2$ of the second portion $S_{P2}$ with respect to the sipe main line 1 (the maximum distance from the sipe main line: 0.4 mm in the shown example). The first portion $S_{P1}$ and the second portion $S_{P2}$ are substantially similar to each other in the geometrical terms but different in size from each other in the present embodiment. Rigidity, in the vicinity of an inclined sipe, of the land portion can be varied in the tire radial direction by forming the inclined sipe as described above. Rigidity in the vicinity of the first portion $S_{P1}$ is relatively small because the amplitude of the first portion $S_{P1}$ situated in the outer side in the tire radial direction is relatively large, while rigidity in the vicinity of the second portion $S_{P2}$ is relatively large because the amplitude of the second portion $S_{P2}$ situated in the inner side in the tire radial direction is relatively small in the example of FIG. 10E.

Figure 7E:
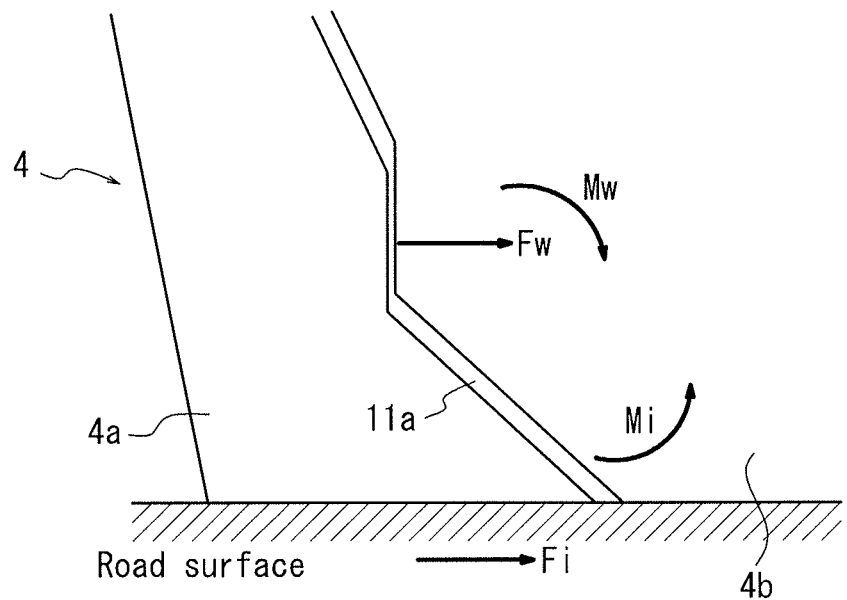
FIG. 7E is a view showing a state of a block-shaped land portion of the tire shown in FIG. 1 when force for driving/braking is inputted thereto.

FIG. 7E shows an effect caused by the land portion in the vicinity of the inclined sipe of FIG. 10E when an input force is applied in the same direction as the circumferential direction in which the sipe main line of the inclined sipe extends toward the outer side in the tire radial direction. Since rigidity in the vicinity of the second portion $S_{P2}$ on the inner side in the tire radial direction is relatively large as described above, it is possible to generate the moment Mw capable of more reliably cancelling out the moment Mi caused by an input force Fi and thus suppress deformation of a sub-land portion $4b$ better, thereby improving the dry performances and the wet performances of the tire better.

Figure 7F:
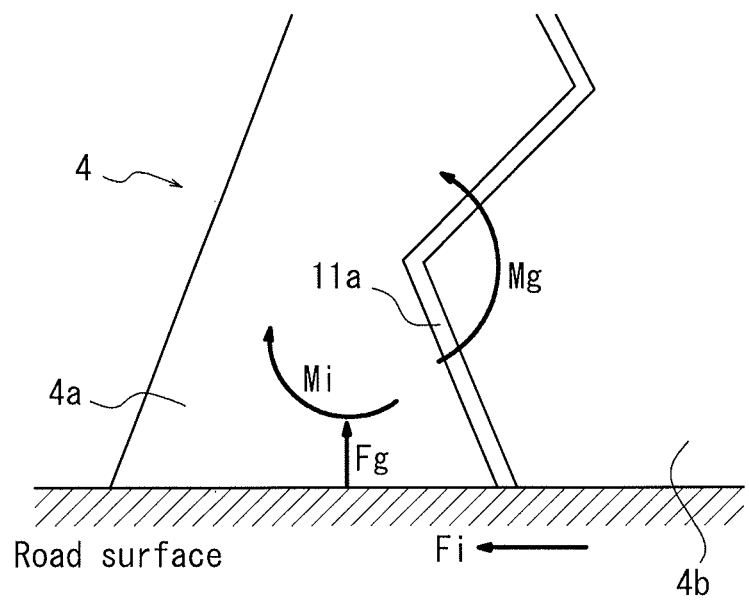
FIG. 7F is a view showing a state of a block-shaped land portion of the tire shown in FIG. 1 when force for driving/braking is inputted thereto.

FIG. 7F shows an effect caused by the land portion in the vicinity of the inclined sipe of FIG. 10E when an input force is applied in the same direction as the circumferential direction in which the sipe main line of the inclined sipe extends toward the inner side in the tire radial direction. In this case, since rigidity in the vicinity of the second portion $S_{P2}$ on the inner side in the tire radial direction is relatively large as described above, it is possible to generate the moment Mg capable of more reliably cancelling out the moment Mi caused by an input force Fi and thus suppress deformation of a sub-land portion $4a$ better, thereby improving the dry performances and the wet performances of the tire better.

Both of amplitude and wavelength are differentiated between the first portion $S_{P1}$ and the second portion $S_{P2}$ in the aforementioned embodiment. However, it is acceptable to differentiate only amplitude and set substantially the same wavelength between the two portions or differentiate only wavelength and set substantially the same amplitude between the two portions. Further, the inclination sipe of FIG. 10E may have an isosceles triangular wave configuration or the like, instead of a sharply cranked configuration. Yet further, although the inclined sipe takes on a configuration in which two triangles are point-symmetrical with respect to the intersection $P_1/P_2$ of the inclined sipe with the sipe main line in FIG. 10E, one of these two triangles may be larger in size than the other, alternatively. The effect of varying rigidity of the land portion in the tire radial direction described above can be similarly caused in these modified examples, as well.

Figure 8:
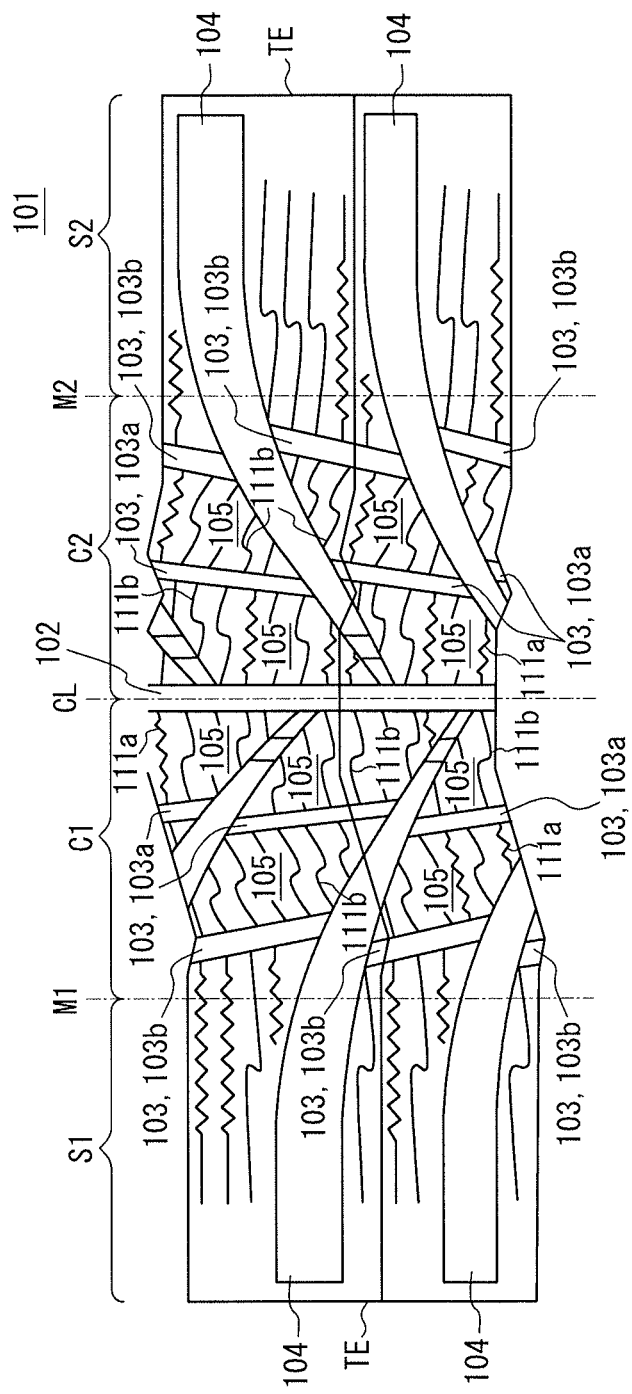
FIG. 8 is a partially developed view of a tread of a pneumatic tire according to yet another embodiment of the present invention.

FIG. 8 is a partially developed view of a tread 101 of a pneumatic tire according to yet another embodiment of the present invention.

The tire has in the tread 101: circumferential grooves including a circumferential center groove 102 continuously extending on the tire equatorial plane CL and a plurality of longitudinal grooves 103 located on the outer side in the tire width direction of the circumferential center groove 102 and on the inner side in the tire width direction of tread ends TE and each extending in the tire circumferential direction; and a plurality of lateral grooves 104 extending from each tread end TE toward the inner side in the tire width direction, respectively, as shown in FIG. 8.

A "tread end" represents the outermost position in the tire width direction of a ground contact surface of the tread and a "ground contact surface" represents an outer peripheral surface over the entire circumference of the tire, which surface is to be brought into contact with a road surface when the tire is rotated in a state where the tire has been inflated at predetermined internal pressure with load corresponding to the maximum loading capacity thereof exerted thereon.

The lateral groove 104 gradually increases a groove width thereof and gradually decreases an inclination angle with respect to the tire width direction toward the outer side in the tire width direction.

The plurality of the longitudinal grooves 103 each open to the corresponding two lateral grooves 104 adjacent in the tire circumferential direction and extend to be inclined with respect to the tire circumferential direction between these two adjacent lateral grooves 104 in the example shown in FIG. 8.

A plurality of blocks 105 as land portions are demarcated by the circumferential center groove 102, the longitudinal main grooves 103 on the outer side in the tire width direction of the circumferential center groove 102, and the lateral grooves 104. A plurality of sipes 111a, 111b are provided at a surface of each block 105 in the shown example. These sipes are unanimously the inclined sipes described above. Each of these inclined sipe has inner bent portions each protruding with respect to the sipe main line and peaks of the inner bent portions are positioned deeper than 20% of the sipe depth measured from the surface of the land portion in the depth direction. The sipe main line(s) of at least one of the inclined sipes is inclined in a direction opposite, with respect to the tire radial direction, to the sipe main line of any one of the other inclined sipes in a cross section orthogonal to the sipe extending direction.

Provided that M1, M2 each represent the middle position in the tire width direction between the tire equatorial plane CL and the corresponding tread end TE; C1, C2 represent areas between the tire equatorial plane CL and the middle positions M1, M2, respectively; and S1, S2 represent areas between the middle positions M1, M2 and the tread ends TE, respectively, a groove width of the lateral groove 104 in the shoulder areas S1, S2 is larger than a groove width of the lateral groove 104 in the center areas C1 C2 because the lateral groove 104 gradually increases a groove width thereof toward the outer side in the tire width direction in the tire of the present embodiment.

Further, a groove depth of the longitudinal groove 103b on the outer side in the tire width direction is shallower than a groove depth of the longitudinal groove 103a on the inner side in the tire width direction in the tire of the present embodiment.

Yet further, surfaces of the land portions of the tire shown in FIG. 8 are provided with: inclined sipes each extending in a zigzag-bent manner with an amplitude in the tire circumferential direction, except at respective ends in the tire width direction thereof, as shown in FIG. 3 (the sipe 111a in FIG. 8); and inclined sipes each extending in a sharply cranked manner and constituted of repetition of a widthwise portion 11w extending substantially in the tire width direction and a circumferential portion 11r extending substantially in the tire circumferential direction, as shown in FIG. 4 (the sipe 111b in FIG. 8).

An effect caused by the tire of the present embodiment will be described hereinafter.

Friction force on a snowy road surface is generated by compression resistance serving as running resistance against a front surface of a tire, surface friction force at a block surface of a tread, snow column shearing force of groove portions, edge effects by block edges, and the like.

According to the tire of the present embodiment, provision of the circumferential center groove 102 continuously extending on the tire equatorial plane CL improves drainage properties on the tire equatorial plane CL having a relatively long ground contact length, thereby efficiently ensuring good wet performances of the tire.

Further, provision of the plurality of the longitudinal grooves 103 ensures good edge effects, caused by block edges demarcated by the longitudinal grooves 103, against lateral force generated in a turning situation and thus good lateral gripping force on a snowy road surface, thereby well improving on-snow turning performance of the tire. In a front-wheel-drive car in general, load on the vehicle rear side is smaller than load on the vehicle front side. The tire of the present embodiment, in which a groove depth of the longitudinal groove 103a on the inner side in the tire width direction is larger than a groove depth of the longitudinal groove 103b on the outer side in the tire width direction, can increase edge effects in a lateral direction by the longitudinal grooves even when load and a ground contact configuration resulting from the load are relatively small as in the rear side of a front-wheel-drive car described above, thereby well increasing lateral force, i.e. a stability factor on snow, in a small-load situation, to improve not only lateral gripping force on snow but also front-rear balance on a snowy road surface, so that on-snow performances of the tire are comprehensively improved.

Further, the sipes formed in each block are the inclined sipes, each of the inclined sipe has inner bent portions each protruding with respect to the sipe main line, and peaks of the inner bent portions are positioned deeper than 20% of the sipe depth measured from the surface of the land portion in the depth direction. The sipe main line(s) of at least one of the inclined sipes is inclined in a direction opposite, with respect to the tire radial direction, to the sipe main line of any of the other inclined sipes in a cross section orthogonal to the sipe extending direction. As a result, rigidity of the block is enhanced and snow column shearing force and the edge effect caused by the block are effectively demonstrated even when lateral force is exerted on the block, whereby on-snow stability and controllability performance of the tire is improved.

Yet further, good snow column shearing force can be ensured to enhance gripping force in the vehicle front-rear direction on a snowy road surface when a force in the vehicle front-rear direction is inputted to the tire on the snowy road surface because groove widths of the lateral grooves 104 in the shoulder portions S1, S2 are larger than groove widths of the lateral grooves 104 in the center portions C1, C2.

Yet further, drainage properties can be efficiently improved in the tire of the present embodiment because a groove depth of the longitudinal groove 103a on the inner side in the tire width direction is larger than a groove depth of the longitudinal groove 103b on the outer side in the tire width direction (a ground contact length of the longitudinal groove 103a tends to be longer than that of the longitudinal groove 103b).

Yet further, satisfactory rigidities of the shoulder portions S1, S2 can be ensured in the tire of the present embodiment because a groove depth of the longitudinal groove 103b on the outer side in the tire width direction is shallow, despite of a possible decrease in rigidities of the shoulder portions S1, S2 due to groove widths of the lateral grooves 104 in the shoulder portions S1, S2 being larger than groove widths of the lateral grooves 104 in the center portions C1, C2.

The sipes of the present embodiment can cause a particularly good effect when they are applied to a tire in which the sum of the groove area of the circumferential center groove 102 and the groove areas of the plurality of the longitudinal grooves 103 is less than 50% of the total groove area of all grooves in the tread ground contact surface 101.

The lateral grooves 104 have relatively large groove widths when the total groove area of the lateral grooves 104 is relatively large, thereby increasing snow column shearing force and the edge effects caused by the blocks and thus increasing contribution made by these force and effects to better stability and controllability of the tire. Application of the sipes of the present invention to such a tire as described above enhances snow column shearing force and the edge effects caused by the blocks of the tire, thereby significantly improving stability and controllability of the tire.

EXAMPLES

Test tires according to Examples and Comparative Examples, each having tire size: 195/65R15, were prepared and performances thereof were evaluated, as described below.

Each of the Example tires 1 to 8 and Comparative Example tires 1 to 3 is provided with block-shaped land portions as shown in FIG. 1.

Inclined sipes each having width: 0.7 mm, depth (a distance measured from a tread surface): 7 mm, and two inner bent portions as shown in a perspective view of FIG. 9A and a cross sectional view of FIG. 10A are formed in four rows of the blocks of Example tire 1. The same definition of "depth" of each inclined sipe as in Example 1 tire is applied to the other test tires. In Example tire 1, the depth of a peak of the inner bent portion closest to the tread surface is 3 mm. The sipe main lines of the inclined sipes on one side of each block-shaped land portion, with respect to the center in the circumferential direction of the block-shaped land portion, are inclined in a direction opposite, with respect to the tire radial direction, to the sipe main lines of the inclined sipes on the other side of the block-shaped land portion in the perspective view. A bottom-raised portion is provided at one end in the tire width direction of each of the sipes, i.e. in the vicinity of a position at which the sipe opens to the corresponding circumferential groove, in a staggered manner in the land portion as a whole (not shown in the drawings). The extending directions of the sipes substantially correspond to the tire width direction at surfaces of the land portions.

Example 2 tire has substantially the same structures as those of Example 1 tire, except that the inclination directions with respect to the tire radial direction of the respective two adjacent inclined sipes are opposite to each other in the former, as shown in FIG. 9B.

Example 3 tire has substantially the same structures as those of Example 2 tire, except that the sipes each extend at a surface of the land portion in a zigzag manner except at respective ends in the tire width direction thereof in the former, as shown in FIG. 9C.

Example 4 tire has substantially the same structures as those of Example 3 tire, except that the sipes each have at a surface of the land portion a trapezoidal wave-like configuration constituted of repetition of a portion extending in the extending direction of the sipe and a portion extending to be inclined with respect to the sipe extending direction in the former, as shown in FIG. 9D.

Example 5 tire has substantially the same structures as those of Example 1 tire, except that the sipes each have four inner bent portions and at a surface of the land portion a trapezoidal wave-like configuration in the former, as shown in FIG. 9E and FIG. 10B.

Figure 9F:
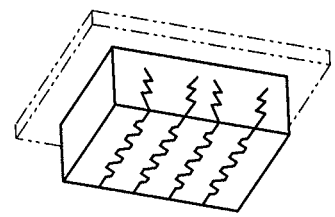
FIG. 9F is a perspective view showing a block-shaped land portion of an Example tire/a Comparative Example tire.

Example 6 tire has substantially the same structures as those of Example 5 tire, except that the inclination directions with respect to the tire radial direction of the respective two adjacent inclined sipes are opposite to each other in the former, as shown in FIG. 9F.

Example 7 tire has substantially the same structures as those of Example 6 tire, except that the sipes are each provided with no bottom-raised portion at ends in the tire width direction thereof in the former.

Figure 9G:
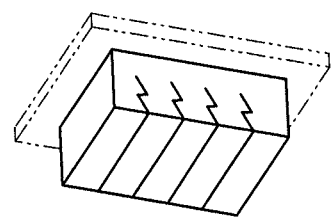
FIG. 9G is a perspective view showing a block-shaped land portion of an Example tire/a Comparative Example tire.
Figure 9H:
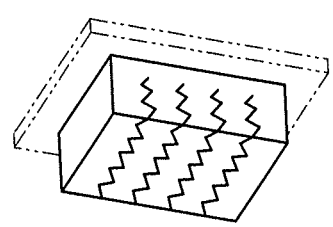
FIG. 9H is a perspective view showing a block-shaped land portion of an Example tire/a Comparative Example tire.
Figure 9I:
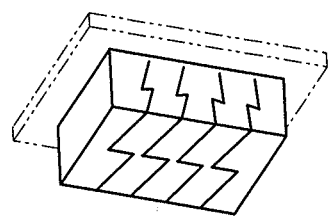
FIG. 9I is a perspective view showing a block-shaped land portion of an Example tire/a Comparative Example tire.

Example 8 tire has substantially the same structures as those of Example 1 tire, except that: in the former the sipes each have at a surface of the land portion a configuration constituted of repetition of a widthwise portion extending to be slightly inclined with respect to the tire width direction and a circumferential portion extending to be slightly inclined with respect to the tire circumferential direction so that the sipe as a whole extends with sharply cranked bends, i.e. each sipe has two surface bent portions at the surface of the land portion; and the sipe main lines of the inclined sipes unanimously approach the center in the tire circumferential direction of the block-shaped land portion as they extend toward the inner side in the tire radial direction, as shown in FIG. 9I and FIG. 10A.

Example tire 9 is provided with block-shaped land portions as shown in FIG. 8. Surfaces of the land portions of Example tire 9 are as shown in FIG. 8 provided with: inclined sipes 111a each extending in a zigzag-bent manner with an amplitude in the tire circumferential direction; and inclined sipes 111b each extending in a sharply cranked manner and constituted of repetition of a widthwise portion extending to be slightly inclined with respect to the tire width direction and a circumferential portion extending to be slightly inclined with respect to the tire circumferential direction. A cross sectional view in the tire radial direction of the inclined sipes 111a, 111b corresponds to that shown in FIG. 10A.

Regarding Comparative Example tire 1, inclined sipes each having two inner bent portions as shown in a perspective view of FIG. 9G and a cross sectional view of FIG. 10A are formed in block rows thereof.

Regarding Comparative Example tire 2, sipes of which sipe main lines are not inclined with respect to the tire radial direction, as shown in FIG. 9H and FIG. 10C, are formed in the outermost block rows on respective sides in the tire width direction of a tread thereof (these two outermost block rows will be referred to as "block rows of shoulder portions" hereinafter and expressed as "Shoulder portions" in Table 1). On the other hand, four inclined sipes each having width: 0.7 mm, depth: 7 mm and extending in the tire radial direction are formed in the two inner block rows adjacent to the tire equatorial plane CL therebetween (these two innermost block rows will be referred to as "block rows of center portions" hereinafter and expressed as "Center portions" in Table 1). Bottom-raised portions are provided at respective ends in the tire width direction of each of the sipes of the shoulder portions and the center portions. Other structures of Example tire 9 tire are the same as those of Example 1 tire.

Comparative Example 3 tire has substantially the same structures as those of Example 7 tire, except that the depth of a peak of the inner bent portion closest to the tread surface is 1 mm in the former.

Each of the test tires described above was assembled with a rim having size: 15×6J, inflated at air pressure of 200 kPa, and subjected to an on-snow acceleration test, a wet braking test, a dry braking test, and an on-snow stability and controllability test as described below.

<On-Snow Acceleration Test>

On-snow traction performance of the test tire was evaluated by: mounting the tires of the same type on a vehicle; placing the vehicle on an snowy surface; and counting time (acceleration time) taken for the vehicle to run 50 m after the vehicle went full throttle from a standstill. The results are shown in Table 1.

The results shown in Table 1 are index values each obtained by calculating a reciprocal of the acceleration time and converting the reciprocal to an index value relative to the corresponding reciprocal of Comparative Example tire 2 being "100". The larger index value represents the better on-snow traction performance of the tire.

<Wet/Dry Braking Test>

A wet braking test was carried out by measuring a braking distance travelled, by the vehicle originally running at 80 km/hour, in a time period from application of full brakes thereto till the complete stop thereof on a wet road. Further, a dry braking test was carried out by measuring a braking distance travelled, by the vehicle originally running at 100 km/hour, in a time period from application of full brakes thereto till the complete stop thereof on a dry road. These results are also shown in Table 1.

The results shown in Table 1 are index values each obtained by calculating a reciprocal of the braking distance and converting the reciprocal to an index value relative to the corresponding reciprocal of Comparative Example tire 2 being "100". The larger index value represents the better wet braking performance and dry braking performance of the tire.

<On-Snow Stability and Controllability Test>

On-snow stability and controllability performance of the test tire was evaluated by mounting the tires of the same type on a vehicle; driving the vehicle on a snowy road of a test course; and counting time taken for the vehicle to run a lap around the test course. The results are shown in Table 1.

The results shown in Table 1 are index values each obtained by calculating a reciprocal of the lap time and converting the reciprocal to an index value relative to the corresponding reciprocal of Comparative Example tire 2 being "100". The larger index value represents the better on-snow stability and controllability performance of the tire.

TABLE 1

|  |  | Example 1 | Example 2 | Example 3 | Example 4 | Example 5 | Example 6 |
|---|---|---|---|---|---|---|---|
| Tread pattern |  | FIG. 1 | | | | | |
| Sipe | Center portions | FIG. 9A | FIG. 9B | FIG. 9C | FIG. 9D | FIG. 9E | FIG. 9F |
|  | Shoulder portions | FIG. 10A | FIG. 10A | FIG. 10A | FIG. 10A | FIG. 10B | FIG. 10B |
| Bottom-raised portions |  | Staggered pattern | | | | | |
| Depth of the shallowest inner bent portion (mm) |  | 3 | | | | 2 | |
| On-snow traction performance |  | 109 | 109 | 107 | 108 | 107 | 107 |
| Wet braking performance |  | 104 | 104 | 106 | 106 | 106 | 106 |
| Dry braking performance |  | 102 | 102 | 104 | 104 | 105 | 105 |
| On-snow stability and controllability |  | 100 | 100 | 101 | 101 | 101 | 101 |

|  |  | Example 7 | Example 8 | Example 9 | Comp. Example 1 | Comp. Example 2 | Comp. Example 3 |
|---|---|---|---|---|---|---|---|
| Tread pattern |  | FIG. 1 | | FIG. 8 | | FIG. 1 | |
| Sipe | Center portions | FIG. 9F FIG. 10B | FIG. 9I FIG. 10A | FIG. 8 FIG. 10A | FIG. 9G FIG. 10A | FIG. 9H FIG. 10C | FIG. 9F FIG. 10B |
|  | Shoulder portions |  |  |  |  | 2D-sipe |  |
| Bottom-raised portions |  | — | Staggered pattern | Staggered pattern | Staggered pattern | Widthwise both ends | — |
| Depth of the shallowest inner bent portion (mm) |  | 2 | 2 | 2 | 3 | 2 | 1 |
| On-snow traction performance |  | 108 | 109 | 105 | 104 | 100 | 102 |
| Wet braking performance |  | 106 | 104 | 103 | 102 | 100 | 101 |
| Dry braking performance |  | 104 | 102 | 102 | 101 | 100 | 100 |
| On-snow stability and controllability |  | 101 | 102 | 103 | 99 | 100 | 101 |

It is understood from the results shown in Table 1 that Example tires 1 to 9 unanimously exhibit significantly better on-snow traction performance, wet braking performance and dry braking performance than Comparative Examples 1 to 3. The tread suffered from no damages when blades were pulled out after the vulcanization, thereby rendering the tire production easy, in Example tire 5. Example tires 8 and 9 each exhibit significantly better on-snow stability and controllability performances than Comparative Example tires 1 to 3.

REFERENCE SIGNS LIST 1, 101 Tread
2, 102, 103 Circumferential groove
3, 104 Lateral groove
4, 105 Block-shaped land portion
4a, 4b Sub-land portion
11t Peak as surface bent portion
11, 11a-11d, 111a, 111b Sipe (inclined sipe)
41 Surface of block-shaped land portion
1a-1d Sipe main line
$P_1$-$P_4$ Peaks of inner bent portions

The invention claimed is:

1. A pneumatic tire, having a plurality of sipes formed in land portions of a tread thereof so as to each open at a surface of a land portion and extend in the tire width direction, wherein:
in a cross section of the land portion in a direction orthogonal to the sipe extending direction, provided that an imaginary line linking an open end at the surface of the land portion and the innermost end in the tire radial direction of each sipe is regarded as a sipe main line, at least two of the sipes in the land portion are "inclined sipes" in which the sipe main lines thereof are each inclined with respect to the tire radial direction;
each inclined sipe has inner bent portions each protruding with respect to the sipe main line and peaks of the inner bent portions are positioned deeper than 20% of the sipe depth measured from the surface of the land portion in the cross section; and
the sipe main line(s) of at least one of the inclined sipes are inclined in a direction opposite, with respect to the tire radial direction, to the sipe main line of any one of the other inclined sipes in the cross section,
wherein:
in the cross section, each inner bent portion consists of a first portion extending in a direction slanted with respect to the sipe main line thereof and a second portion connected to the first portion and extending in a direction intersecting said sipe main line, the first portion is longer than the second portion, and these two portions collectively form a bent angle at the peak ($P_1$, $P_2$, . . . ) of the inner bent portion,
in the cross section, the inner bent portions of each inclined sipe include a first inner bent portion ($S_{P1}$) closest to the surface of the land portion and a second inner bent portion ($S_{P2}$) adjacent to the first inner bent portion on the inner side in the tire radial direction, the first inner bent portion and the second inner bent portion being connected to each other by way of the second portions thereof respectively extending in directions intersecting said sipe main lines, and
in the cross section, a first incident angle ($\theta_{p1}$), formed between the second portion of the first inner bent portion ($S_{P1}$) and the sipe main line thereof, is different from a second incident angle ($\theta_{p2}$), formed between the second portion of the second inner bent portion ($S_{P2}$) and the sipe main line thereof.

2. The pneumatic tire of claim 1, wherein the inclined sipe has two or less surface bent portions at the surface of the land portion.

3. The pneumatic tire of claim 1, wherein the inclined sipe extends in a zigzag-bent manner in at least a portion thereof at the surface of the land portion.

4. The pneumatic tire of claim 1, wherein at the surface of the land portion the inclined sipe is constituted of repetition of a portion extending in an extending direction of the inclined sipe and a portion extending to be inclined with respect to the sipe extending direction.

5. The pneumatic tire of claim 1, wherein at least one of the inclined sipes has four or more inner bent portions.

6. The pneumatic tire of claim 1, wherein the land portions are block-shaped land portions demarcated by a plurality of circumferential grooves extending in the tire circumferential direction and a plurality of lateral grooves each communicate with the two adjacent circumferential grooves, and
the sipe main lines of the inclined sipes on one side of each block-shaped land portion, with respect to the center in the circumferential direction of the block-shaped land portion, are inclined in a direction opposite, with respect to the tire radial direction, to the sipe main line(s) of at least one inclined sipe on the other side of the block-shaped land portion in the cross section.

7. The pneumatic tire of claim 1, wherein an amplitude of the first inner bent portion ($S_{P1}$) with respect to the sipe main line thereof is larger than an amplitude of the second inner bent portion ($S_{P2}$) with respect to the sipe main line.

8. The pneumatic tire of claim 1, wherein at least one of the inclined sipes has four inner bent portions.

9. The pneumatic tire of claim 1,
wherein, at the surface of the land portion, the inclined sipe includes a set of sipe portions,
wherein, at the surface of the land portion, the set of the sipe portions consists of a first extending portion extending in an extending direction of the inclined sipe, a first inclined portion extending to be inclined with respect to the extending direction of the inclined sipe, a second inclined portion extending to be inclined with respect to the extending direction of the inclined sipe, and a second extending portion extending in the extending direction of the inclined sipe,
wherein, at the surface of the land portion, a first bent point connects the first extending portion and the first inclined portion, a second bent point connects the first inclined portion and the second extending portion, and a third bent point connects the second extending portion and the second inclined portion, and
wherein, at the surface of the land portion, the first inclined portion and the second inclined portion incline in the opposite direction to each other with respect to the extending direction of the inclined sipe.

10. The pneumatic tire of claim 9,
wherein, at the surface of the land portion, the inclined sipe includes a plurality of the sets of the sipe portions in a repeated manner.

11. The pneumatic tire of claim 9,
wherein, at the surface of the land portion, the inclined sipe includes a plurality of the sets of the sipe portions in a repeated manner, such that the inclined sipe forms a trapezoidal wave shape.

12. The pneumatic tire of claim 11,
wherein the land portions are block-shaped land portions demarcated by a plurality of circumferential grooves extending in the tire circumferential direction and a plurality of lateral grooves each communicate with the two adjacent circumferential grooves, and
the sipe main lines of the inclined sipes on one side of each block-shaped land portion, with respect to the center in the circumferential direction of the block-shaped land portion, are inclined in a direction opposite, with respect to the tire radial direction, to the sipe main line(s) of at least one inclined sipe on the other side of the block-shaped land portion in the cross section.

13. The pneumatic tire of claim 1, wherein the first incident angle ($\theta_{p1}$) is smaller than the second incident angle ($\theta_{p2}$), and the second portion of the first inner bent portion ($S_{P1}$) and the second portion of the second inner bent portion ($S_{P2}$) form a bent line.

14. A pneumatic tire, having a plurality of sipes formed in land portions of a tread thereof so as to each open at a surface of a land portion and extend in the tire width direction, wherein:
in a cross section of the land portion in a direction orthogonal to the sipe extending direction, provided that an imaginary line linking an open end at the surface of the land portion and the innermost end in the tire radial direction of each sipe is regarded as a sipe main line, at least two of the sipes in the land portion are "inclined sipes" in which the sipe main lines thereof are each inclined with respect to the tire radial direction;
each inclined sipe has four or more inner bent portions each protruding with respect to the sipe main line and peaks of the inner bent portions are positioned deeper than 20% of the sipe depth measured from the surface of the land portion in the cross section; and
the sipe main line(s) of at least one of the inclined sipes are inclined in a direction opposite, with respect to the tire radial direction, to the sipe main line of any one of the other inclined sipes in the cross section,
wherein in the cross section, each inner bent portion consists of a first portion extending in a direction slanted with respect the sipe main line thereof and a second portion connected to the first portion and extending in a direction intersecting said sipe main line, the first portion is longer than the second portion, and the first and second portions collectively form a bent angle at the peak ($P_1$, $P_2$, $P_3$, $P_4$) of the inner bent portion,
in the cross section, the inner bent portions of each inclined sipe include a first inner bent portion ($S_{P1}$) closest to the surface of the land portion and a second inner bent portion ($S_{P2}$), adjacent to the first inner bent portion on the inner side in the tire radial direction, the first inner bent portion and the second inner bent portion being connected to each other by way of the second portions thereof respectively extending in directions intersecting said main lines,
in the cross section, a first incident angle ($\theta_{p1}$), formed between the second portion of the first inner bent portion ($S_{P1}$) and the sipe main line thereof, is different from a second incident angle ($\theta_{p2}$), formed between the second portion of the second inner bent portion ($S_{P2}$) and the sipe main line thereof, and
in the cross section, the second portion of the first inner bent portion ($S_{P1}$) and the second portion of the second inner bent portion ($S_{P2}$) form a bent line.

15. The pneumatic tire of claim 14, wherein respective groove wall surfaces of the portion extending in a direction of the sipe main line thereof and the portion extending in a direction intersecting said main line, of each inner bent portion, are brought into contact with each other when the tread is brought into contact with a road surface.

16. The pneumatic tire of claim 15, wherein an amplitude of the first inner bent portion with respect to the sipe main line thereof is larger than an amplitude of the second inner bent portion with respect to the sipe main line.

17. The pneumatic tire of claim 15, wherein the bottom of each inclined sipe is raised in the vicinity of a position where the sipe opens to the circumferential groove.

18. The pneumatic tire of claim 16, wherein the first incident angle ($\theta_{p1}$) is smaller than the second incident angle ($\theta_{p2}$).

* * * * *